United States Patent [19]
Chauvin et al.

[11] 4,005,047
[45] Jan. 25, 1977

[54] CATALYTIC COMPOSITION AND ITS USE FOR POLYMERIZING CYCLOOLEFINS

[75] Inventors: Yves Chauvin, St. Germain en laye; Dominique Commereuc, Meudon; Daniel Cruypelinck, Nanteuil le Haudoin; Jean-Pierre Soufflet, Chatou, all of France

[73] Assignee: Institut Francais du Petrole, Rueil-Malmaison, France

[22] Filed: Feb. 4, 1975

[21] Appl. No.: 547,032

[30] Foreign Application Priority Data

Feb. 4, 1974 France .............................. 74.03715
May 21, 1974 France .............................. 74.18008
Nov. 20, 1974 France .............................. 74.38111

[52] U.S. Cl. .......................... 252/429 R; 252/437; 252/441; 252/443; 526/190
[51] Int. Cl.² ......................................... C08F 4/22
[58] Field of Search ............... 252/429 R, 437, 441, 252/443

[56] References Cited
UNITED STATES PATENTS

| 3,083,246 | 3/1963 | Holzman et al. | 252/443 X |
| 3,173,902 | 3/1965 | Carrick et al. | 252/429 R X |
| 3,622,521 | 11/1971 | Hogan et al. | 252/441 X |
| 3,878,182 | 4/1975 | Kormer et al. | 252/429 R X |

FOREIGN PATENTS OR APPLICATIONS 610,339   12/1960   Canada .............................. 252/437

Primary Examiner—Patrick P. Garvin
Attorney, Agent, or Firm—Millen, Raptes & White

[57] ABSTRACT

New catalytic composition of improved activity in the process of polymerizing cycloolefins, comprising a carbonyl compound or a carbonyl-metal-carbenic compound of molybdenum or tungsten and titanium tetrachloride, said composition being preferably subjected to an irradiation with rays of a wave length from 180 to 700 nanometers during or before use.

7 Claims, No Drawings

CATALYTIC COMPOSITION AND ITS USE FOR POLYMERIZING CYCLOOLEFINS

This invention relates to a new catalytic composition for the conversion of olefins and, more particularly, for the polymerization by ring opening of cyclic mono- or multiolefins.

There are a great number of known catalytic compositions based on tungsten and molybdenum, capable of polymerizing cycloolefins and particularly, cyclopentene to trans-polypentenamer. For example, there are catalytic compositions consisting of a molybdenum or tungsten metallo-carbenic compound and an aluminum chloride or an alkyl aluminum chloride. However, all these compositions suffer from a poor activity which makes it necessary on the one hand, to use high monomer concentrations which are detrimental to the uniformity of the properties of the polymer and, on the other hand, to use large amounts of catalyst, resulting in a high cost of polymer.

In this invention, there has been discovered a new catalytic composition having a considerably improved catalytic activity; this catalytic composition according to the invention, comprises:

a. a carbonyl compound or a carbonyl-metal-carbenic compound of molybdenum or tungsten;
b. titanium tetra-chloride.

The monomers which can be polymerized by the catalytic system of the invention are cyclopentene and cyclic olefins containing from 7 to 12 carbon atoms in the ring, for example cyclooctene, cyclooctadiene, cyclododecene, cyclododecatriene, norbornene, norbornadiene, these olefins being used alone or as a mixture.

The carbonyl or substituted carbonyl compounds of molybdenum and tungsten which are convenient for the manufacture of the catalyst have the general formula:

$$M(CO)_y L_z$$

in which L is a polar molecule such as an ether, amine, nitrile, ketone, pyridine, phosphine, arsine, stibine or a phosphorus, arsenic or antimony trihalide; M is molybdenum or tungsten, z is zero or an integer from 1 to 5, y is 6−zN, N being the number of polar groups in the molecule. For example, when L contains 2 or 3 polar groups, y will have respectively the values 6−2z or 6−3z.

Among these compounds, there are included, by way of illustration but not limitation:

$W(CO)_6$, $Mo(CO)_6$, $W(CO)_5$(tetrahydrofuran), $W(CO)_5$ (acetone)$_5$, $W(CO)_5$ (acetonitrile), $W(CO)_4$ (acetonitrile)$_2$, $W(CO)_3$ (acetonitrile)$_3$, $W(CO)_5$ (acrylonitrile), $W(CO)_5$(morpholine), $W(CO)_5$(cyclohexylamine), $W(CO)_4$(ethylenediamine), $W(CO)_3$ (pyridine)$_3$, $W(CO)_5$($\alpha$-picoline), $W(CO)_4$ ($\alpha$, $\alpha'$-dipyridine), $W(CO)_5$(n-butylamine), $W(CO_5$(aniline), $W(CO)_5$triphenylphosphine), $W(CO)_5$(tributylphosphine), $W(CO)_4$(phosphorus trichloride)$_2$, $W(CO)_5$(hexamethylphosphoramide), $W(CO)_4$ (1,2-diphosphino ethane), $W(CO)_5$(triphenylarsine), $Mo(CO)_5$(pyridine), $Mo(CO)_4$(pyridine)$_2$.

These compounds may be obtained by direct substitution of the carbonyl metal by means of the coordinate of formula L or by any other method known in the art.

The carbenic metal compounds of molybdenum and tungsten which are convenient for the manufacture of the catalyst are more particularly carbonyl and substituted carbonyl derivatives, either ionic or not, such as alkyl or aryl, alkoxy, aryloxy, amino, alkylamino, thio or alkylthio molybdenum or tungsten pentacarbonyl compounds, optionally in the form of complexes with amines, phosphines, arsines or stibines, of the general formula:

$$L_x (CO)_{5-x} M C(R) R'$$

in which L is a polar molecule such as an ether, amine, nitrile, ketone, pyridine, phosphine, arsine, stibine or a phosphorus, arsenic or antimony trihalide; M is molybdenum or tungsten; R and R', either similar or different, are selected from the radicals $R_1$, $OR_3$, $SR_1$, $NHR_1$ and $NR_1R_2$ in which $R_1$ and $R_2$ are hydrogen or hydrocarbyl radicals and $R_3$ is hydrogen or a hydrocarbyl radical or a quaternary ammonium group, and x is zero or 1. Preferably R is a $XR_4$ group in which X is oxygen, sulfur or nitrogen and $R_4$ is an alkyl or aryl or quaternary ammonium radical, R' is an alkyl or aryl group containing from 1 to 12 carbon atoms and L is an amine, phosphine, arsine or stibine.

Among these compounds, are:

$(CO)_5W C (OCH_3)CH_3$; $(CO)_5W C (OC_2H_5) (C_6H_5)$; $[N(CH_3)_4]^+$ $(CO)_5MoC$ $(O^-)CH_3$, $[N(C_2H_5)_4]^+[(CO)_5WC(O^-)C_6H_5]$; $(CO)_4[P(C_6H_5)_3]WC (OCH_3)(C_6H_5)$; $(CO)_4(As(C_6H_5)_3]WC(OC_2H_5)(C_6H_5)$; $(CO)_5W C (OC_2H_5) (C_4H_9)$; $(CO)_5W C (OC_2H_5) N (CH_3)_2$; $(CO)_5MoC (OC_2H_5) (C_4H_9)$.

The polymerization reaction is preferably conducted in the presence of a solvent. The most convenient solvents are organic solvents such as aliphatic or cycloaliphatic hydrocarbons containing from 5 to 10 carbon atoms, e.g. pentane, hexane heptane or aromatic hydrocarbons such as benzene or toluene or aliphatic or aromatic halogenated hydrocarbons such as chlorobenzene.

According to a preferred embodiment of the invention, we prepare separate solutions of the molybdenum or tungsten compound, of the titanium tetrachloride and of the monomer in one of the above-mentioned solvents; subsequently, we admix the three solutions, at the selected temperature. The order of introduction of the solutions into one another is immaterial but any contact between titanium tetrachloride and the cycloolefin in the absence of the Mo or W compound must be avoided. We preferably proceed under inert atmosphere free from oxygen and moisture, for example under nitrogen or argon atomsphere. The polymerization is advantageously carried out under atmospheric pressure but it is possible to proceed under subatmospheric or super-atmospheric pressure.

The polymerization is conducted for example at a temperature from −30° to +60° C, and preferably, from −10° to +50° C.

The amount of tungsten or molybdenum compound which is used per 100 g of monomer is generally from 0.0001 to 0.1 m M, and preferably, from 0.001 to 0.01 m M. The molar ratio of titanium tetrachloride to the molybdenum or tungsten compound is preferably selected from 5/1 to 300/1.

After a reaction time in the range from 1 hour to 10 hours, the catalyst is deactivated, for example by adding methanol, ethanol or water thereto. The polymer may be stabilized by such antioxidants as used for other elastomers, for example ditertiary butyl paracresol or phenylnaphthylamine.

The solvent of the reaction and unreacted cyclolefin are then removed, for example by heteroazeotropic steam stripping, either under atmospheric pressure or under a lower pressure. The separated polymer is then dried.

The resulting elastomer contains all the unsaturation initially contained in the monomer from which it is manufactured, the double bonds having a "cis" and "trans" configuration; however, in the case of a polypentenamer, the content of trans double bonds is generally high and greater than 85%. The gel content of the polymer is nill. Moreover, it is possible to vary the distribution of the molecular weights of the polymer by adjusting the temperature and the reaction time.

According to a preferred embodiment, the catalyst is irradiated before and/or during the reaction.

Before and/or during and/or after the components (a) and (b) of the catalyst have been admixed together, the one or more solutions are irradiated by means of rays of a wave length from 180 to 700 nanometers, such as produced by the sun or by any other light source such for example as a mercury burner.

The use of irradiation before and/or during the polymerization reaction appears to be of particular advantage as far as the activity of the catalyst is concerned; thus it is possible, by this way, to obtain more than 150 Kg of polymer per gram of tungsten used in the form of a complex.

It has been observed moreover that the activity of the catalyst could be increased by increasing its temperature, before use, to a level higher than its temperature of use, for example by heating the catalyst, before use, to a temperature from 40° to 120° C.

The following examples illustrate the invention without being limitative of the scope thereof.

Examples 1 to 9, 11, 14 and 16 have been conducted with the use of day light.

EXAMPLE 1

In a flask of glass having a 500 ml capacity, preliminarily made free of air and moisture, we successively introduce, at 22° C : 100 ml of cyclopentene, 200 ml of benzene, 40 ml of a solution of tungsten phenylethoxycarbene pentacarbonyl $(CO)_5W$ C $(OC_2H_5)$ $(C_6H_5)$ in benzene at a concentration of 1 g per liter and finally 10 ml of a solution in heptane of titanium tetrachloride at a concentration of 64 g per liter. The temperature is maintained unchanged for 6 hours and we introduce subsequently 20 ml of ethanol and 10 mg of ditertiary butyl paracresol. The reactor content is poured into 2 liters of water, and then, benzene, heptane and unreacted cyclopentene are stripped with steam.

The separated polymer is dried under vacuun. There is thus obtained 46.2 g of polymer, which corresponds to a conversion rate of 60% with respect to the starting cyclopentene. The obtained polymer has an intrinsic viscosity of 1.4 and a content of trans double bonds of 83%. Its gel content is nill.

EXAMPLE 2

In the same operating conditions as in example 1, except that the operating temperature is 35° C, we have obtained a conversion of 59% and a content of trans double bonds amounting to 90%. The polymer does not contain any gel.

EXAMPLE 3

The operating conditions are the same as in example 1, except that we introduce only 20 ml of the same carbene solution and 5 ml of the same titanium tetrachloride solution and, while proceeding at a temperature of 40° C, we have obtained a conversion to polymer of 66% and a content of trans double bonds amounting to 90%. The polymer does not contain any gel.

EXAMPLE 4

While proceeding under the same operating conditions as in example 1 but with the introduction of only 12 ml of the same carbene solution and 4 ml of the same titanium tetrachloride solution, at a temperature of 35° C, we have obtained a conversion of 53% and a content of trans double bonds amounting to 88%. The polymer does not contain any gel.

EXAMPLE 5

In a glass flask of a 500 ml capacity, we successively introduce, at 35° C, 27.5 mg of tungsten tetramethylammonium phenylacylpentacarbonyl [N $(CH_3)_4][(CO)_5W$ CO $C_6H_5]$, 200 ml of benzene, 100 ml of cyclopentene and finally 5 ml of a solution, at a concentration of 64 g per liter, of titanium tetrachloride in heptane. After 6 hours of reaction, we introduce 20 ml of ethanol and 10 mg of ditertiary butyl paracresol.

We pour the content of the flask into about 2 liters of water and benzene heptane and unreacted cyclopentene are carried away under reduced pressure, as produced with a water-jet pump. We have thus obtained 35.5 g of polypentenamer having a content of trans double bonds of 85% and an inrinsic viscosity in tetrahydrofuran of 1.42 dl/g as calculated by integration of the viscosities of the fractions obtained by exclusion chromatography in liquid phase.

EXAMPLE 6 (given by way of comparison)

50 ml of cyclopentene are dissolved into 50 ml of chlorobenzene under argon atmosphere. A carbene of the formula $(CO)_5W$ C $(CH_3)$ $OC_2H_5$ and 100 mg of Al $(C_2H_5)$ $Cl_2$ are added thereto. After 15 minutes, the polymer is precipitated in ethanol. There is recovered a polypentenamer of high molecular weight (intrinsic viscosity:2.5). After several tests it has been determined that at least 30 mg of the aforesaid carbene was necessary to obtain 27 g of polypentenamer.

This example has been repeated except that dichloroethylaluminum was replaced by 100 mg of titanium tetrachloride. It has been determined that in such a case, only 2 mg of the same carbene was sufficient for obtaining the same weight (27 g) of polypentenamer (intrinsic viscosity : 2.5).

EXAMPLE 7

Into a glass flask of a 50 ml capacity, made free of air and moisture, we introduce successively, at 31° C, 10 ml of cyclopentene, 20 ml of benzene, 0.5 mg of tungsten pentacarbonyl pyridine complex in solution in 1 ml of benzene and 32 mg of titanium tetrachloride in solution in 1 ml of heptane. The temperature is maintained for 6 hours and then 2 ml of ethanol and 1 mg of ditertiarybutyl paracresol are introduced.

The content of the reactor is poured into about 200 ml of water. Benzene, heptane and unreacted cyclopentene are stripped with steam under vacuum. The separated polymer which is dried under vacuum, has been obtained in an amount of 4.6 g corresponding to a conversion rate of 60% with respect to the starting cyclopentene. It has an intrinsic viscosity of 3.5 and a content of trans double bonds of 87%. It does not contain any gel.

EXAMPLE 8

In the same conditions as in example 7, but with the use of 1 mg of tungsten tetracarbonyl dipyridine complex in place of tungsten pentacarbonyl pyridine and 64 mg of titanium tetrachloride, we have obtained 3 g of a polymer whose intrinsic viscosity is 3.2 and whose content of trans double bonds is 86%.

EXAMPLE 9

In the same conditions as in example 7 but with the use of 0.5 mg tungsten tricarbonyl trisacetonitrile complex in place of tungsten pentacarbonyl pyridine, we have obtained 4.95 g of a polymer having an intrinsic viscosity of 3.3 and a content of trans double bonds of 87%.

EXAMPLES 10 to 12

We have carried out a series of comparative experiments showing the effect of irradiation on the reaction velocity. For this purpose, we make use of a cylindrical reactor of Pyrex glass having a 200 ml capacity, provided with a double jacket for temperature regulation by water circulation, a magnetic rod for stirring and a device for introducing the liquids by means of syringes. In the reactor, preliminarily made free from air and moisture, we successively introduce, at 30° C, 60 ml of benzene, 20 ml of cyclopentene containing 120 parts of 2-pentene and 210 parts of 2-methyl-2-butene per million of parts, 0.2 mg of tungsten phenylethoxycarbene pentacarbonyle $(CO)_5$- W C $(OC_2H_5)$ $(C_6H_5)$, contained in 0.2 ml of benzene and finally 14 mg of titanium tetrachloride contained in 0.2 ml of heptane. The temperature and the stirring are maintained for a period of 4 hours at the end of which we introduce 2 ml of ethanol and 5 mg of ditertiarybutylparacresol. The content of the reactor is poured into about one half liter of water and benzene, heptane and unreacted cyclopentene are then stripped with steam; the separated polymer is finally dried under vacuum.

In the first example, we have maintained the reactor in total darkness from the time at which the reactants have been introduced up to the time where the catalyst has been deactivated.

In the second example, we have maintained the reactor in the day light without direct exposure to sun beams, from the beginning to the end of the reaction.

In the third example, we have irradiated the reactor by means of a UV lamp of the HANAU TQ 150 type during all the reaction time.

The results of the experiments are reported in table I

TABLE I

|  | Example No 10 (darkness) | Example No 11 (day light) | Example No 12 (UV irradiation) |
|---|---|---|---|
| Polymer yield % | 7.4 | 48 | 58 |
| % trans | 82 | 84 | 85 |
| intrinsic viscosity | 3.5 | 5.0 | 2.8 |
| Kg of polypentenylene per g of W | 12.5 | 93.5 | 112.5 |

TABLE I-continued

|  | Example No 10 (darkness) | Example No 11 (day light) | Example No 12 (UV irradiation) |
|---|---|---|---|

EXAMPLES 13 to 15

These examples are comparative experiments illustrating the effect of irradiation on the reaction velocity.

Under the same conditions as those of examples 10 to 12, we made use of 60 ml of benzene, 20 ml of cyclopentene, 0.5 mg of a mixture of tungsten trisacetonitrile tricarbonyl and tungsten bisacetonitrile tetracarbonyl and 25 mg of titanium tetrachloride dissolved in 0.4 ml of heptane. The polymer has been separated as above stated.

Example 13 has been conducted in total darkness, example 14 in the day light (without direct exposure to sun beams), example 15 under irradiation of a UV lamp of HANAU TQ 150 type. The results of the tests are reported in table II.

TABLE II

|  | Example No 13 (darkness) | Example No 14 (day light) | Example No 15 (UV irradiation) |
|---|---|---|---|
| Polymer yield % | traces | 10 | 52 |
| % trans | — | 84 | 85 |
| intrinsic viscosity | — | 2.9 | 2.5 |

EXAMPLES 16 & 17

These examples are comparative tests showing the effect of irradiation.

Under the same conditions as in examples 10 to 12, we made use of 60 ml of benzene or carbon tetrachloride, 20 ml of cyclopentene, 4 mg of tungsten hexacarbonyl W $(CO)_6$ and 264 mg of titanium tetrachloride dissolved in 4 ml of toluene. The polymer was separated as above-stated. Example 16 has been carried out in the day light (without direct exposure to sun beams) and example 17 under irradiation with a UV lamp of the HANAU TQ 150 type.

The results of the tests are reported in table III

TABLE III

|  | Example No 16 (day light) | Example No 17 (UV irradiation) |
|---|---|---|
| Solvent | benzene | carbon tetrachloride |
| Polymer yield % | 27 | 54 |

EXAMPLE 18

In a flask of inactinic glass maintained at 31° C and preliminarily made free of air and moisture, we successively introduce:
60 ml of benzene
0.4 ml of a benzene solution containing 1 mg of $(CO)_5$W-C $(OC_2H_5)$ $C_6H_5$, per ml of solution,
0.4 ml of a solution in heptane containing 66 mg of $TiCl_4$ per mg of solution,
20 ml of cyclopentene.

After 4 hours of reaction under stirring, a polypentenamer has been separated with a conversion rate of 19.4% with respect to the starting monomer; the polymer has an intrinsic viscosity, as measured in benzene, of 2.95.

EXAMPLE 19

Under identical conditions as in the preceding example, the mixture of benzene, tungsten carbene and TiCl$_4$, in the absence of cyclopentene, has been brought to 70° C for 45 minutes. The cyclopentene is then added and the reaction is performed in 4 hours at 31° C. A polypentenamer is obtained with a conversion rate of 60.4% and it has an intrinsic viscosity of 2.7.

We claim:

1. A catalytic composition, particularly useful for polymerizing cycloolefins, consisting essentially of:
   a. a compound of the formula $$M(CO)_yL_z$$

or $$L_x(CO)_{5-x}MC(R)(R^1)$$

wherein
   M is molybdenum or tungsten;
   L is a hydrocarbyl amine, a hydrocarbyl ether, a hydrocarbyl nitrile, a hydrocarbyl ketone, pyridine, a hydrocarbyl pyridine, a hydrocarbyl phosphine, a hydrocarbyl arsine, a hydrocarbyl stibine, hexamethyl phosphoramide, or a phosphorus, arsenic or antimony trihalide;
   R and R$^1$ are selected from the group consisting of the radicals R$_1$, OR$_3$, SR, NHR and NR$_1$R$_2$ in which R$_1$ and R$_2$ are hydrogen or hydrocarbyl radicals and R$_3$ is hydrogen, a hydrocarbyl radical or a quaternary hydrocarbyl ammonium group;
   x is 0 or 1;
   y is 6 −zN, N being the number of polar groups of L; and
   z is 0 or an integer from 1 to 5; and
   b. titanium tetrachloride, the molar ratio of (b) to (a) being 5 : 1 to 300 : 1 respectively.

2. A catalyst according to claim 1, in which the compound (a) has the formula $$M(CO)_yL_z.$$

3. A catalyst according to claim 1, in which the compound (a) has the formula $$L_x(CO)_{5-x}MC(R)R'.$$

4. A catalyst according to claim 3 in which R is a group XR$_4$ wherein X is oxygen, R$_4$ is an alkyl, hydrocarbyl, aryl or quaternary hydrocarbyl ammonium radical, R' is an alkyl, hydrocarbyl or aryl radical containing from 1 to 12 carbon atoms and L is amine, phosphine, arsine or stibine.

5. A catalytic composition according to claim 1 wherein said compound (a) is W(CO)$_6$, Mo (CO)$_6$, W (CO)$_5$ (tetrahydrofuran); W (CO)$_5$ (acetone)$_5$, W (CO)$_5$ (acetonitrile), W (CO)$_4$-(acetonitrile)$_2$, W(CO)$_3$ (acetonitrile)$_3$, W (CO)$_5$ (acrylonitrile), W (CO)$_5$ (morpholine), W (CO)$_5$(cyclohexylamine), W (CO)$_4$(ethylenediamine), W (CO)$_3$ pyridine$_3$, W (CO)$_5$ (α-picoline), W (CO)$_4$ (α,α'-dipyridine), W (CO)$_5$(n-butylamine), W (CO)$_5$(aniline), W (CO)$_5$(triphenylphosphine), W (CO)$_5$ (tributylphosphine), W (CO)$_4$(-phosphorus trichloride)$_2$, W (CO)$_5$(hexamethylphosphoramide), W (CO)$_4$(1,2-diphosphino ethane), W (CO)$_5$(triphenylarsine), Mo (CO)$_5$ (pyridine), or Mo (CO)$_4$(pyridine)$_2$.

6. A catalytic composition according to claim 1 wherein said compound (a) is (CO)$_5$W C (OCH$_3$)CH$_3$; (CO)$_5$W C (OC$_2$H$_5$) (C$_6$H$_5$); [N(CH$_3$)$_4$]$^+$ (CO)$_5$MoC (O$^-$)CH$_3$, [N(C$_2$H$_5$)$_4$]$^+$[(CO)$_5$WC(O$^-$)C$_6$H$_5$]; (CO)$_4$[P(C$_6$H$_5$)$_3$]WC (OCH$_3$) (C$_6$H$_5$); (CO)$_4$ ]As(C$_6$H$_5$)$_3$]WC(OC$_2$H$_5$); (C$_6$H$_5$); (CO)$_5$W C (OC$_2$H$_5$) (C$_4$H$_9$); (CO)$_5$W C (OC$_2$H$_5$) N (CH$_3$)$_2$; or (CO)$_5$MoC (OC$_2$H$_5$) (C$_4$H$_9$).

7. A catalytic composition according to claim 1 subjected to irradiation with rays of a wave length of 180 to 700 nanometers.

* * * * *